Patented Apr. 27, 1954

2,676,968

UNITED STATES PATENT OFFICE 2,676,968

ARALKYLPHENOXYACETAMIDINE AND DERIVATIVES THEREOF

Robert R. Burtner, Skokie, Ill., assignor to G. D. Searle & Co., Chicago, Ill., a corporation of Illinois No Drawing. Application January 24, 1952, Serial No. 268,150

14 Claims. (Cl. 260—294.7)

The present invention relates to a new group of amidine derivatives and, more particularly, to the aralkylphenoxyacetamidine derivatives of the structural formula

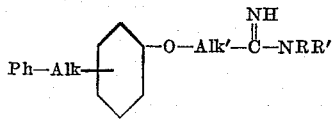

and salts thereof, wherein Ph is a phenyl nucleus, Alk and Alk' are lower alkylene radicals and NRR' is a member of the class consisting of amino, lower alkylamino, lower dialkylamino and saturated nitrogen-containing heterocyclyl radicals.

In the foregoing structural formula Alk and Alk' represent lower alkylene radicals such as methylene, ethylene, propylene, butylene, trimethylene and tetramethylene. The radicals R and R' can be hydrogen or such lower alkyl radicals as methyl, ethyl, straight and branched chain propyl, butyl, amyl and hexyl. In addition the radical NRR' can represent a heterocyclic amino radical wherein the amino group is aliphatic in character as in the case of morpholino, piperidino, pyrrolidino, lupetidino, thiamorpholino, piperazino, and like radicals. For the purposes of this invention the phenyl nucleus, Ph, can be substituted by halogen, lower alkyl, and lower alkoxyl radicals.

For medicinal purposes it is preferable to use these compounds in the form of the salts which they form with a variety of inorganic and strong organic acids including sulfuric, phosphoric, hydrochloric, hydrobromic, sulfamic, citric, oxalic, ascorbic and related acids. These substances have valuable pharmacodynamic effects, especially on the cardiovascular and renal systems.

The amidines of this invention are prepared by the following general method, all symbols having the same meaning as hereinabove. An ω-halogenated nitrile of the type Halogen—Alk'—CN is condensed with an aralkylphenol of the type

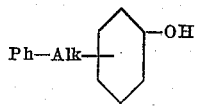

to form the ether of the type

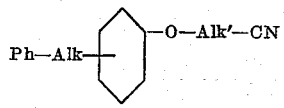

The latter is then treated with a lower aliphatic alcohol and a strong mineral acid to form the corresponding mineral acid salt of the lower alkyl aralkylphenoxyalkanoimidate of the type

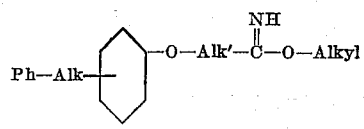

which is then treated with ammonia or an amine of the type HNR'R'' to form the desired amidine.

Typical examples of compounds which are prepared conveniently by this procedure are the following:

A. 2-benzylphenoxyacetamidine

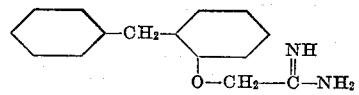

B. N,N-diethyl-2-benzylphenoxyacetamidine

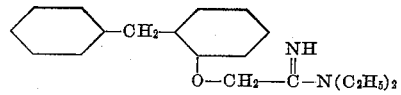

C. 1 - piperidyl - 2 - (2' - benzylphenoxy) ethylidenimine

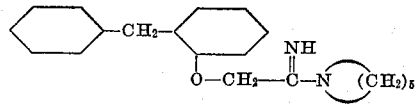

D. 2-(α-phenethyl) phenoxyacetamidine

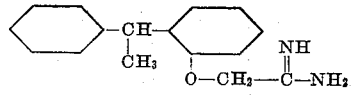

E. N,N - diethyl - 2 - (α - phenethyl) phenoxyacetamidine

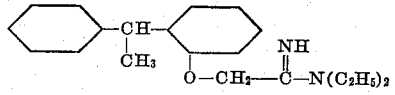

F. N - (n - butyl) - 2 - (α - phenethyl) phenoxyacetamidine

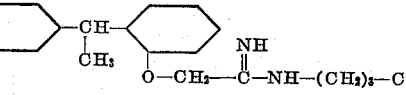

G. 1 - pyrrolidyl - 2 - [2' - (α - phenethyl) - phenoxy] ethylidenimine

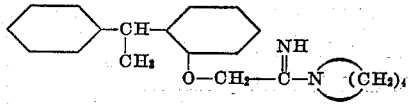

H. 1 - morpholino - 2 - [2' - (α - phenethyl) - phenoxy]ethylidenimine

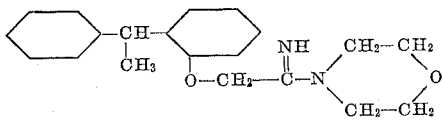

I. 2-(4'-chlorobenzyl) phenoxyacetamidine

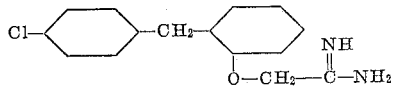

J. N,N - diethyl - 2 - (4' - chlorobenzyl) phenoxyacetamidine

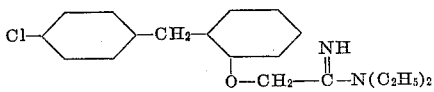

K. 1 - piperidyl - 2 - [2' - (4'' - chlorobenzyl) - phenoxy]ethylidenimine

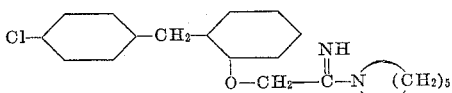

L. N,N - dimethyl - 4 - (3' - methoxyphenethyl) phenoxyacetamidine

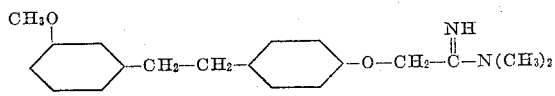

M. N,N - dimethyl - 4 - (3',5' - xylylethyl) - 3 - toloxyacetamidine

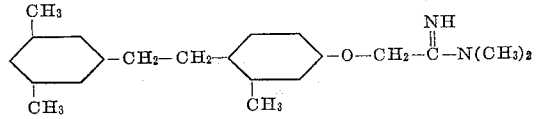

The details of the experimental procedure and some of the materials produced thereby will appear more fully from the following experimental part. It will be apparent to those skilled in the art that the examples and the procedures described herein can be varied by many modifications in materials and methods without departing from the invention and that the invention is not to be construed as limited thereby in spirit or in scope. In the following experimental part, quantities of material are indicated as grams (g.) and milliliters (ml.), temperatures as degrees centigrade (°C.) and pressures as millimeters (mm.) of mercury.

Example 1

A solution of 28 ml. of chloroacetonitrile in 30 ml. of butanone is treated with 1 g. of powdered potassium iodide and allowed to stand for 15 hours. The filtered solution is added dropwise over a 75 minute period to a refluxing, stirred suspension of 73.6 g. of 2-benzylphenol and 52 g. of anhydrous potassium carbonate in 70 ml. of butanone. Refluxing and stirring is continued for one additional hour after which most of the solvent is distilled off under reduced pressure. The residue is taken up in 500 ml. of water and extracted with ether. This ether extract is washed thoroughly with dilute potassium hydroxide to remove the unreacted 2-benzylphenol and finally dried over sodium sulfate and evaporated. The 2-benzylphenoxyacetonitrile is obtained as an almost colorless oil by distillation at about 130–133° C. and 15 mm. pressure.

Example 2

A solution of 74 g. of 2-benzylphenoxynitrile and 16.1 g. of absolute ethanol in 100 ml. of chloroform is chilled in an ice-alcohol bath and treated with a slow stream of anhydrous hydrogen chloride until 12.8 g. of gas are absorbed. Towards the end of the reaction the clear yellow solution sets to a crystalline paste. After storage at 0° C. for 24 hours this paste is suspended in about 500 ml. of ether, the lumps are crushed and the material is filtered, washed with ether and dried in vacuum. The ethyl 2-benzylphenoxyacetimidate hydrochloride melts at about 122° C. with decomposition. It has the structural formula

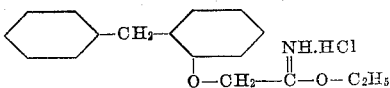

Example 3

A suspension of 30.5 g. of ethyl 2-benzylphenoxyacetimidate hydrochloride and 35 ml. of absolute ethanol containing 2.22 g. of ammonia is shaken in a shielded pressure vessel for 2 days. A small amount of ammonium chloride is removed by filtration and rinsed with absolute alcohol. The filtrate is vacuum distilled to the point of incipient crystallization and then diluted with 300 ml. of ether. The crystalline mass is collected on a filter, rinsed with ether, dried at 75° C. and crystallized from a mixture of 30 ml. of isopropanol and 60 ml. of ethyl acetate. The hydrochloride of 2-benzylphenoxyacetamidine (compound A) is thus obtained in the form of colorless needles melting at about 176° C.

Example 4

A solution of 30.5 g. of ethyl 2-benzylphenoxyacetimidate hydrochloride and 9.5 g. of diethylamine in 110 ml. of absolute ethanol is stored in a stoppered vessel at room temperature for 4 days. The solvent is then vacuum distilled and the residue is taken up in an excess of 1% sodium hydroxide and extracted with ether. This extract is washed with water, dried and concentrated at 10 mm. pressure. The N,N-diethyl-2-benzylphenoxyacetamidine (compound B) is thus obtained as a colorless oil. 27 g. of this base are dissolved in 300 ml. of ether and treated with one equivalent of absolute alcoholic hydrogen chloride to precipitate the crystalline hydrochloride, which is then collected on a filter, rinsed with ether, vacuum dried and recrystallized from a 2:1 mixture of ethyl acetate and isopropanol. The colorless crystals of this hydrochloride melt at about 194° C.

Example 5

A solution of 30.5 g. of ethyl 2-benzylphenoxyacetimidate hydrochloride and 11 g. of piperidine in 125 ml. of absolute ethanol is stored in a stoppered vessel at room temperature for 4 days. After vacuum distillation of the solvent, the residue is taken up in an excess of 1% potassium hydroxide and extracted with ether. The resulting extract is washed with water, dried and concentrated at 10 mm. pressure to yield the 1-piperidyl - 2 - (2' - benzylphenoxy)ethylidenimine (compound C) as a viscous oil. Treatment of an ether solution of this base with one equivalent of hydrogen chloride in absolute ethanol causes precipitation of a crystalline hydrochloride. It is filtered, rinsed, vacuum dried and recrystallized from isopropanol to yield small, colorless crystals melting at about 214° C.

Example 6

A solution of 28 ml. of chloroacetonitrile in 30 ml. of butanone is treated with 1 g. of powdered potassium iodide and allowed to stand overnight. The filtered solution is added dropwise over a 75 minute period to a refluxing, stirred suspension of 79.2 g. of 2-(α-phenethyl)phenol and 52 g. of anhydrous potassium carbonate in 70 ml. of butanone. After refluxing and stirring for one additional hour, most of the solvent is distilled off under vacuum and the residue is taken up in 500 ml. of water and extracted with ether. The ether extract is washed thoroughly with dilute potassium hydroxide to remove the unreacted phenolic compound and finally dried over sodium sulfate. Removal of the solvent and distillation yields a 2-(α-phenethyl)phenoxyacetonitrile as a viscous, yellow oil boiling at about 126–136° C. and 0.2 mm. pressure.

A solution of 75 g. of this nitrile and 15.4 g. of absolute ethanol in 75 ml. of chloroform is chilled in an ice bath and treated with a slow stream of anhydrous hydrogen chloride until 12.3 g. are absorbed. The dark yellow solution is stored in a refrigerator for 48 hours, after which the solvent is vacuum distilled to the point of incipient crystallization. Addition of 300 ml. of ether precipitates the hydrochloride of ethyl 2 - (α - phenethyl)phenoxyacetimidate which is filtered, rinsed with ether and dried in vacuum. The fine white crystals decompose at about 118–119° C.

Example 7

A suspension of 32 g. of the hydrochloride of ethyl 2-(α-phenethyl)phenoxyacetimidate and 35 ml. of absolute alcohol containing 2.2 g. of ammonia is shaken in a pressure bottle for 40 hours. A small amount of ammonium chloride is filtered off and rinsed with absolute ethanol. The filtrate is vacuum distilled to the point of incipient crystallization and then diluted with 300 ml. of ether. The white precipitate is collected on a filter, rinsed with ether and dried at 75° C. Recrystallized by dissolving in 54 ml. of hot isopropanol and slow addition of 108 ml. of ethyl acetate the 2-(α-phenethyl)phenoxyacetamidine (compound D) hydrochloride melts at about 180° C.

Example 8

A solution of 22.5 g. of the hydrochloride of ethyl 2-(α-phenethyl)phenoxyacetimidate and 6.7 g. of diethylamine in 75 ml. of absolute ethanol is stored in a stoppered flask at room temperature for 3 days and then concentrated in vacuo. The residue is taken up in an excess of 1% sodium hydroxide and extracted with ether. This extract is washed with water, dried and freed of solvent by vacuum distillation at 10 mm. pressure, the last trace being distilled at about 75° C. N,N-diethyl-2-(α-phenethyl)phenoxyacetamidine (compound E) is thus obtained as a viscous oil. 20 g. of this base are dissolved in 200 ml. of anhydrous ether and treated with one equivalent of absolute alcoholic hydrogen chloride. The precipitated salt is collected on a filter, rinsed with ether, dried at 75° C. in vacuum and crystallized by dissolving in 60 ml. of hot isopropanol and slow addition of 120 ml. of ethyl acetate. The white crystals of the hydrochloride melt at about 193° C.

Reaction of a solution of 10 g. of the hydrochloride of ethyl 2-(α-phenethyl)phenoxyacetimidate and 3 g. of n-butylamine in 30 ml. of absolute ethanol by the same procedure yields N-(n - butyl) -2 - (α - phenethyl)phenoxyacetamidine (compound F) as a viscous oil. Treatment of 10 g. of the hydrochloride of ethyl 2-(α-phenethyl)phenoxyacetimidate with 2.9 g. of pyrrolidine in ethanol by this method yields N-pyrrolidyl - 2 - [2' - (α - phenethyl)phenoxy] - ethylidenimine (compound G) as an amber viscous oil. The same procedure also serves to prepare N - morpholino - 2 - [2' - (α - phenethyl)-phenoxy]ethylidenimine (compound H) from 10 g. of the hydrochloride of ethyl 2-α-phenethyl)phenoxyacetimidate and 3.5 g. of morpholine.

Example 9

Reaction of 87.4 g. of 2-(4'-chlorobenzyl)phenol, 28 ml. of chloroacetonitrile and 52 g. of potassium carbonate by the method of Example 1 yields 2 - (4' - chlorobenzyl)phenoxyacetonitrile which, on recrystallization from ethanol, melts at about 99° C.

A solution of 69 g. of this nitrile and 13.1 g. of absolute ethanol in 200 ml. of dioxane is chilled in an ice bath and treated with a moderate stream of hydrogen chloride until 10.4 g. are absorbed. The clear dark yellow solution is stored at 0° C. for 24 hours and the precipitate is collected on a filter, pressed dry, triturated with ether and dried. The hydrochloride of ethyl 2-(4' - chlorobenzyl)phenoxyacetimidate thus obtained melts at about 125° C. with decomposition.

Example 10

A suspension of 30 g. of the hydrochloride of ethyl 2 - (4' - chlorobenzyl)phenoxyacetimidate and 35 ml. of absolute ethanol containing 2.2 g. of ammonia is shaken in a shielded pressure reactor for 48 hours. The precipitate is collected on a filter and rinsed with absolute ethanol and the filtrate is concentrated in vacuo and diluted with about 300 ml. of anhydrous ether. The hydrochloride of 2-(4'-chlorobenzyl)phenoxyacetamidine (compound I) crystallizes within a short time. It is collected on a filter, rinsed with ether, dried in vacuo and crystallized from ethyl acetate to yield crystals melting at 125–126° C.

Example 11

A solution of 18 g. of the hydrochloride of ethyl 2 - (4' - chlorobenzyl)phenoxyacetimidate and 5.7 g. of diethylamine in 62 ml. of absolute ethanol is stored in a stoppered flask at room temperature for 4 days and then vacuum distilled. The resulting residue is taken up in an excess of 1% sodium hydroxide and extracted with ether. This extract is washed with water, dried and concentrated at 10 mm. pressure to yield the N,N - diethyl - 2 - (4' - chlorobenzyl)phenoxyacetamidine (compound J) as a viscous oil. Treatment of an ether solution of this base with alcoholic hydrogen chloride causes precipitation of the hydrochloride which, rinsed with ether, dried and recrystallized from a 2:1 mixture of ethyl acetate and isopropanol forms colorless crystals melting at about 183° C.

Example 12

A solution of 18 g. of the hydrochloride of ethyl 2 - (4' - chlorobenzyl)phenoxyacetimidate and 6.7 g. of piperidine in 75 ml. of absolute ethanol is stored in a stoppered flask at room temperature for 3 days and then concentrated. The residue is dissolved in an excess of 1% sodium hydroxide solution and extracted with ether. This ether extract is washed with water, dried and concentrated in vacuum to yield the 1-piperidyl - 2 - [2' - (4'' - chlorobenzyl)phenoxy]ethylidenimine (compound K) as a viscous oil. Treatment of an ether solution with one equivalent of absolute alcoholic hydrogen chloride yields an initially viscous hydrochloride which crystallizes on standing at 0° C. After trituration with ether, filtration, rinsing, drying, and recrystallization from isopropanol, colorless crystals are obtained which melt at about 210° C.

I claim:

1. The new group of organic compounds consisting of the aralkylphenoxyacetamidine derivatives of the structural formula

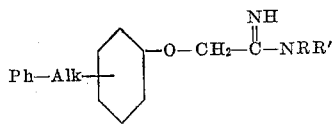

and the salts thereof, wherein Ph is a radical of the class consisting of unsubstituted phenyl, halogenated phenyl, lower alkylated phenyl and lower alkoxylated phenyl radicals, Alk is a lower alkylene radical and NRR' is a member of the class consisting of amino, lower alkylamino, lower dialkylamino, pyrrolidino, piperidino, and morpholino radicals.

2. The salts of the compounds of the structural formula

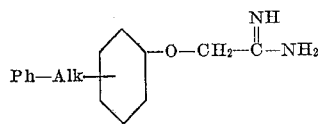

wherein Ph is a phenyl nucleus and Alk is a lower alkylene radical.

3. The salts of the compounds of the structural formula

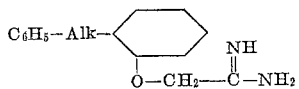

wherein Alk is a lower alkylene radical.

4. The salts of the compounds of the structural formula

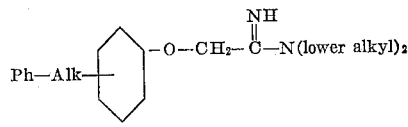

wherein Ph is a phenyl nucleus and Alk is a lower alkylene radical.

5. The salts of the compounds of the structural formula

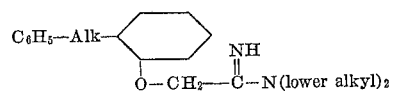

wherein Alk is a lower alkylene radical.

6. The salts of the compounds of the structural formula

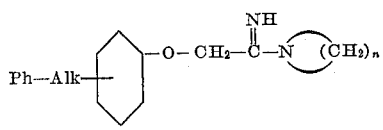

wherein $n$ is an integer greater than 3 and smaller than 6, Ph is a phenyl nucleus and Alk is a lower alkylene radical.

7. The salts of the compounds of the structural formula

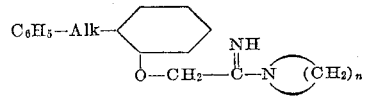

wherein $n$ is an integer greater than 3 and smaller than 6, and Alk is a lower alkylene radical.

8. The salts of the compounds of the structural formula

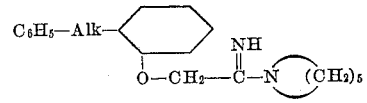

wherein Alk is a lower alkylene radical.

9. The salts of the compounds of the structural formula

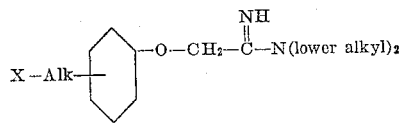

wherein X is a halogenated phenyl radical and Alk is a lower alkylene radical.

10. The salts of the compounds of the structural formula

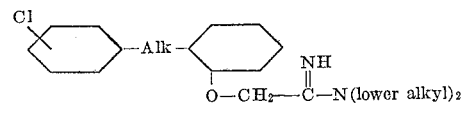

wherein Alk is a lower alkylene radical.

11. The salts of the compounds of the structural formula

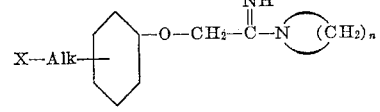

wherein $n$ is an integer greater than 3 and smaller than 6, X is a halogenated phenyl radical, and Alk is a lower alkylene radical.

12. The salts of the compounds of the structural formula

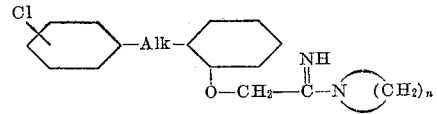

wherein $n$ is an integer greater than 3 and smaller than 6, and Alk is a lower alkylene radical.

13. The salts of the compounds of the structural formula

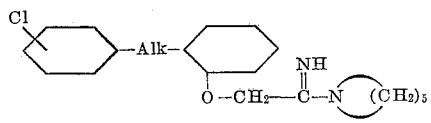

wherein Alk is a lower alkylene radical.

14. Hydrochloride of N,N-diethyl-2-benzylphenoxyacetamidine.

References Cited in the file of this patent

UNITED STATES PATENTS

| Number | Name | Date |
|---|---|---|
| 2,131,141 | Miescher et al. | Sept. 27, 1938 |
| 2,149,457 | Miescher et al. | Mar. 7, 1939 |

OTHER REFERENCES

Chem. Abstract, vol. 44, page 10154 (1950).